United States Patent
Fong et al.

(10) Patent No.: US 10,310,908 B2
(45) Date of Patent: Jun. 4, 2019

(54) DYNAMIC USAGE BALANCE OF CENTRAL PROCESSING UNITS AND ACCELERATORS

(71) Applicant: International Business Machines Corporation, Armonk, NY (US)

(72) Inventors: Liana L. Fong, Irvington, NY (US); Wei Tan, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 15/241,754

(22) Filed: Aug. 19, 2016

(65) Prior Publication Data

US 2018/0052709 A1    Feb. 22, 2018

(51) Int. Cl.
  *G06F 9/46*    (2006.01)
  *G06F 9/50*    (2006.01)
(52) U.S. Cl.
  CPC ................... *G06F 9/5044* (2013.01)
(58) Field of Classification Search
  CPC ............................ G06F 9/4881; G06F 9/4831
  See application file for complete search history.

(56) References Cited

U.S. PATENT DOCUMENTS

| 6,301,603 | B1 * | 10/2001 | Maher | .................. | G06F 9/5044 |
| | | | | | 700/94 |
| 8,669,990 | B2 | 3/2014 | Sprangle et al. | | |
| 8,843,894 | B2 | 9/2014 | Dawson et al. | | |
| 9,870,255 | B2 * | 1/2018 | Hou | ....................... | G06F 9/4843 |
| 2011/0173155 | A1 | 7/2011 | Becchi et al. | | |
| 2014/0337832 | A1 * | 11/2014 | Adogla | ............... | G06F 9/45533 |
| | | | | | 718/1 |

OTHER PUBLICATIONS

M. Zaharia et al., "Resilient Distributed Datasets: A Fault-Tolerant Abstraction for In-Memory Cluster Computing," Proceedings of the 9th USENIX Conference on Networked Systems Design and Implementation (NSDI), Apr. 2012, 14 pages.
Wikipedia, "Apache Spark," https://en.wikipedia.org/wiki/Apache_Spark, Aug. 1, 2016, 6 pages.
Brad Nemire, "Accelerate Recommender Systems with GPUs," https://developer.nvidia.com/accelerated-computing, May 5, 2016, 8 pages.
Wikipedia, "CUDA," https://en.wikipedia.org/wiki/CUDA, Jul. 29, 2016, 14 pages.
Wikipedia, "MapReduce," https://en.wikipedia.org/wiki/MapReduce, Jul. 4, 2016, 11 pages.

(Continued)

*Primary Examiner* — Camquy Truong
(74) *Attorney, Agent, or Firm* — Rahan Uddin; Ryan, Mason & Lewis, LLP (57) ABSTRACT

Techniques for dynamically balancing usage of central processing units (CPUs) and accelerators are provided. For example, a method is provided for receiving a task request for associated with a workload. A utility value is calculated for a plurality of strategies for executing the workload. At least two of the plurality of strategies are associated with a distribution of the workload between the CPU and the one or more accelerators. A strategy having a maximum utility value is selected from the plurality of strategies, and the task is executed according to the selected strategy.

16 Claims, 9 Drawing Sheets

(56) References Cited

OTHER PUBLICATIONS

Wikipedia, "Power8," https://en.wikipedia.org/wiki/POWER8, Jul. 13, 2016, 7 pages.

Jeff Stuecheli, "POWER8," International Business Machines Corporation, Sep. 26, 2006, 20 pages.

M. Li et al., "Scaling Distributed Machine Learning with the Parameter Server," 11th USENIX Symposium on Operating Systems Design and Implementation (OSDI), Oct. 6-8, 2014, pp. 583-598.

* cited by examiner

DYNAMIC USAGE BALANCE OF CENTRAL PROCESSING UNITS AND ACCELERATORS

BACKGROUND

A hybrid computing infrastructure may contain heterogeneous processors. For instance, a hybrid computing infrastructure may be comprised of general processors, such as central processing units (CPUs) and one or more accelerators, such as graphical processing units (GPUs). As sequential and parallel operations are being employed together in complex software programs, coordination between CPU and GPU resources is a challenge.

SUMMARY

Illustrative embodiments of the invention provide techniques for dynamically balancing usage of central processing units and accelerators.

For example, in one illustrative embodiment, a method comprises receiving a task request for associated with a workload. A utility value is calculated for a plurality of strategies for executing the workload. At least two of the plurality of strategies are associated with a distribution of the workload between a CPU and the one or more accelerators. A strategy having a maximum utility value is selected from the plurality of strategies, and the task is executed according to the selected strategy.

More particularly, in one illustrative embodiment, the CPU comprises at least one core comprising at least one thread. In one illustrative embodiment, each accelerator is a GPU.

The embodiments described herein may further be embodied in a computer program product and a system.

DETAILED DESCRIPTION

A hybrid computing infrastructure generally refers to one or more computing systems that contain both general and special-purposed computing platforms. Software programs (e.g., applications) may benefit from running in a hybrid computing infrastructure, since such an infrastructure may serve as a platform for workload optimization. For example, for applications running in a hybrid computing infrastructure, security and reliability priority components may be placed in one set of infrastructure processors, while computation intense components may be placed in a different set of infrastructure processors.

Different types of computing paradigms or applications may leverage on hybrid computing infrastructures. One type of computing paradigm that relies heavily on a hybrid computing infrastructure is cognitive computing. Cognitive computing is a computing paradigm that simulates human thought processes in a computer system. The system uses machine learning algorithms for functions such as pattern recognition, data mining, and natural language processing to mimic operation of the human brain.

For example, in a cognitive computing environment, frameworks may provide for processing large data sets with a parallel, distributed algorithm on a cluster of computer servers or nodes, in order to scale-out the computations. Accelerators may be provided on individual nodes in order to scale-up, i.e., to accelerate the computation.

Figure 1A:
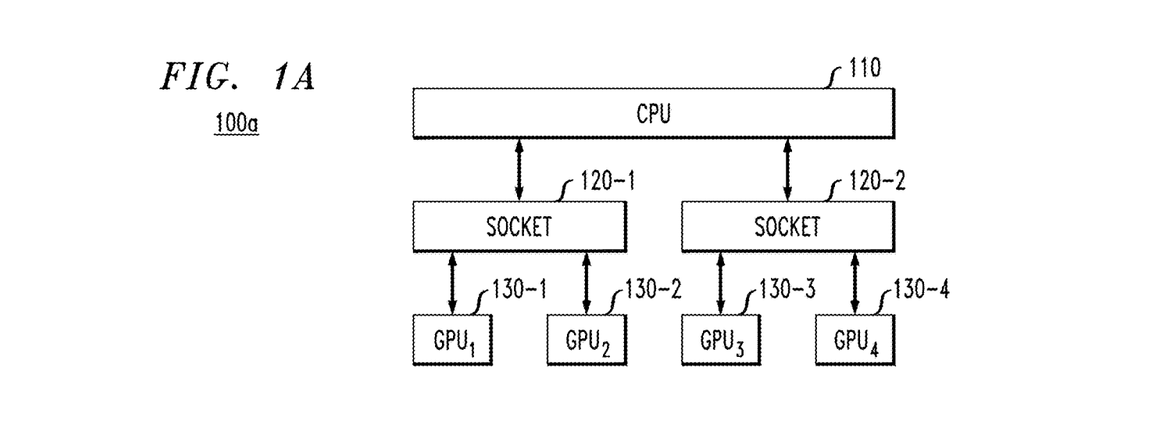
FIG. 1A illustrates an exemplary architectural relationship hierarchy of a hybrid computing infrastructure, in accordance with at least one embodiment.

FIG. 1A illustrates an exemplary architectural relationship hierarchy 100a of a hybrid computing infrastructure. As shown, CPU 110 is at a top level of hierarchy 110a. Below CPU 110 are sockets 120-1 and 120-2. In one embodiment, sockets 120-1 and 120-2 are PCIe sockets. One or more accelerators, such as one or more GPUs, may be placed below sockets 120-1 and 120-2 in hierarchy 100a. In one embodiment, and as shown, $GPU_1$ 130-1 and $GPU_2$ 130-2 are connected to socket 120-1, and $GPU_3$ 130-3 and $GPU_4$ 130-4 are connected to socket 120-2. It is to be understood and appreciated that the number of CPUs, sockets, and GPUs shown in FIG. 1A is purely exemplary, and should not be considered limiting.

Figure 1B:
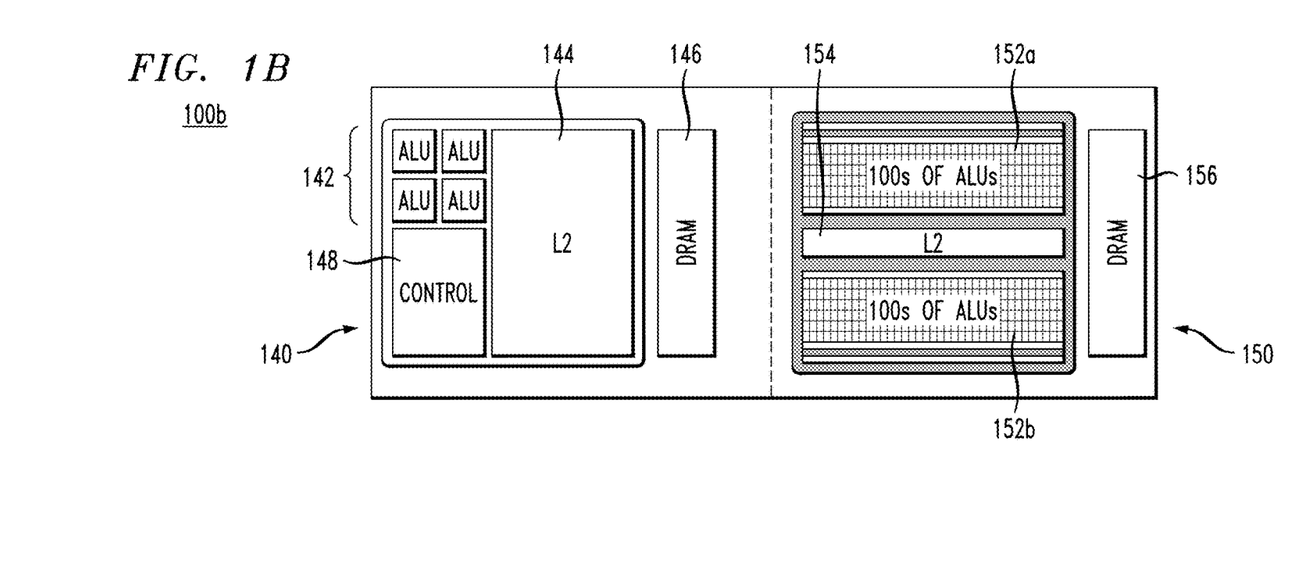
FIG. 1B illustrates a block diagram comparing a CPU with a GPU, in accordance with at least one embodiment.

FIG. 1B is illustrates a block diagram 100b comparing an exemplary CPU 140 with an exemplary GPU 150. For the purposes of the illustrative embodiment depicted in FIG. 1B, CPU 140 is shown as having a set of arithmetic logical units (ALUs) 142 and L2 cache 144. Set of ALUs 142 is shown including four ALUs. However, the number of ALUs of the CPU should not be considered limiting. CPU 140 is further shown as having dynamic random-access memory (DRAM) 146. However, any type of RAM may be implemented within CPU 140 in accordance with the embodiments described herein. CPU 140 is further shown as having control unit 148.

For the purposes of the illustrative embodiment depicted in FIG. 1B, GPU 150 is shown with set of ALUs 152a, set of ALUs 152b and L2 cache 154. Each set of ALUs 152a and 152b is shown including hundreds of ALUs. However, the number of ALUs of the GPU should not be considered limiting. GPU 150 is further shown as having DRAM 156. However, any type of RAM may be implemented within the GPU in accordance with the embodiments described herein.

The differences between the exemplary CPU 140 and the exemplary GPU 150 discussed in relation to FIG. 1B correspond to differences in performance between a CPU and a GPU. To illustrate such differences in performance metrics, an exemplary Intel® Xeon® Processor E5-2687w CPU ("Xeon") will be compared with an exemplary NVIDIA® Tesla® K40 GPU accelerator ("Tesla"). The Xeon has 2.27B transistors, 8 cores and 16 threads, and operates at a base frequency of 3.1 GHz. Additionally, the Xeon has a SP TFLOP (single precision teraflop) value of 0.35 and a DP TFLOP (double precision teraflop) value of 0.17. As is known in the art, the term flop refers to floating-point operations per second. With respect to memory specifications, the Xeon has a maximum memory size of 256 GB, and has a DDR3 SDRAM memory with a sample rate of 1600 megatransfers per second (MT/s).

In contrast to the Xeon, the Tesla has 7.1B transistors, 2880 cores and 30720 threads, and operates at a base frequency of 745 MHz. Additionally, the Tesla has a SP TFLOP value of 4.29, and a DP TFLOP value of 1.43. With respect to memory specifications, the Tesla has a maximum memory size of 12 GB, and has a GDDR5 memory with a sample rate of 3 GHz.

Based on the foregoing performance metric comparison, a GPU has a slower clock and fewer cache. Thus, the GPU is not optimized for latency. However, a GPU has more transistors to compute with, as compared to a CPU, as well as higher FLOP values and memory bandwidth. Accordingly, a GPU is optimized for data-parallel, high-throughput workloads.

As compared to CPUs, GPUs generally have a smaller main memory. Operation may be slowed down due to data fetches to GPUs from CPU memory. In one embodiment, a fast scheme to perform a context switch between tasks may be implemented by a GPU to hide latency. In other words, task waiting for data fetches may yield to other tasks with data already in memory.

Figure 2:
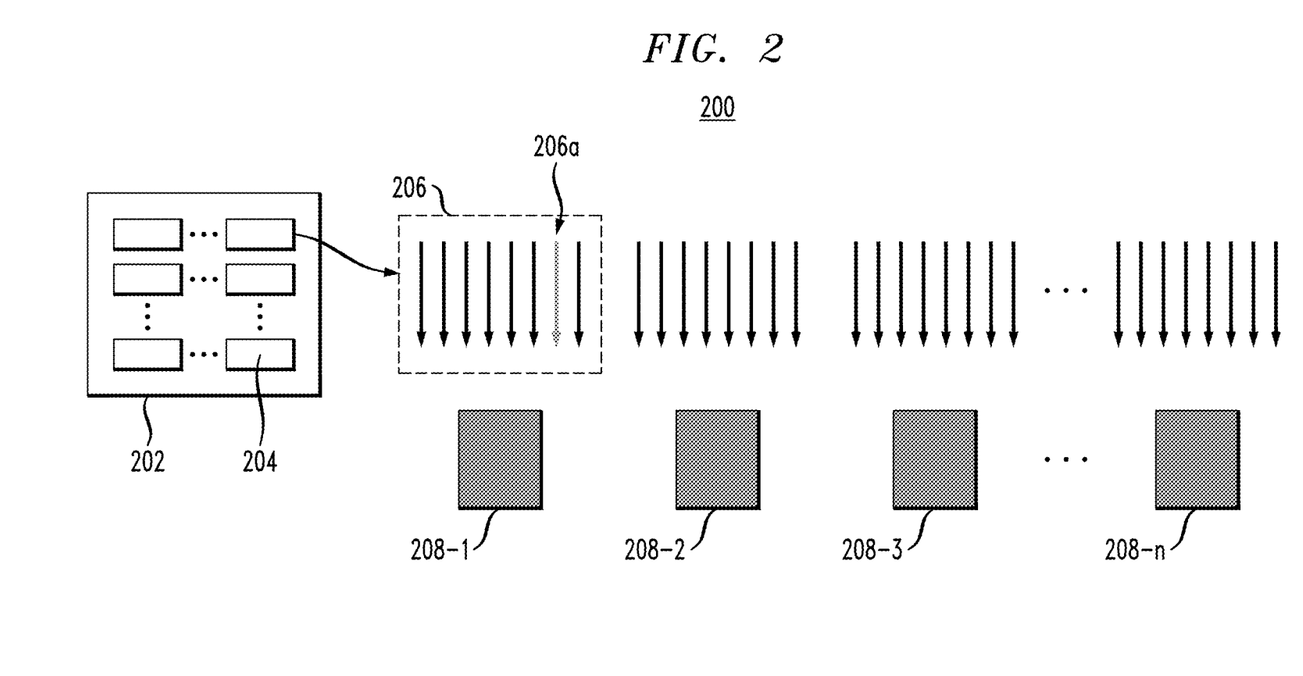
FIG. 2 illustrates CPU threads and cores and available GPUs for hybrid cognitive computing, in accordance with at least one embodiment.

FIG. 2 illustrates a hybrid computing infrastructure 200. It is to be appreciated that, in one embodiment, infrastructure 200 can be implemented via the hierarchy shown in FIG. 1A, and the CPU/GPU specifications shown in FIG. 1B.

In one embodiment, infrastructure 200 is a hybrid cognitive computing system. Infrastructure 200 comprises CPU 202 and one or more accelerators 208-1, 208-2, 208-3, . . . , 208-n. In one embodiment, and as shown in FIG. 2, each accelerator is a GPU. CPU 202 comprises a plurality of processing cores (or simply, cores) 204 with each core being configured to execute a plurality of threads 206. Each thread, such as thread 206a, may provide a single line of commands that are processed. In illustrative embodiments, the number of GPUs may be less than the number of CPU cores. Due to constraints (e.g., memory constraints), each GPU may be unable to accommodate acceleration requests from many CPU threads.

Apache Spark™ is an important scale-out framework for big data and cognitive workloads. Apache Spark™ enables programmers with an application programming interface (API) centered on resilient distributed datasets (RDDs). RDDs are distributed memory abstractions that allow performance of in-memory computations on large clusters in a fault-tolerant way, and enable efficient data reuse in-memory for a broad range of applications. Specifically, RDDs are fault-tolerant, parallel data structures that allow users to explicitly persist intermediate results in memory, control partitioning to optimize data placement for parallel processing, and manipulate them by using a rich set of operators. The availability of RDDs in-memory facilitates the implementation of both iterative algorithms, which visit their dataset multiple times in a loop, and interactive/exploratory data analysis, i.e., the repeated database-style querying of data.

Dynamically balancing instruction execution between the CPUs and accelerators (e.g., GPUs) within the hybrid computing infrastructure is a consideration with respect to usage optimization of CPUs and GPUs to meet operation objectives, such as short execution time and low cost.

Figure 3:
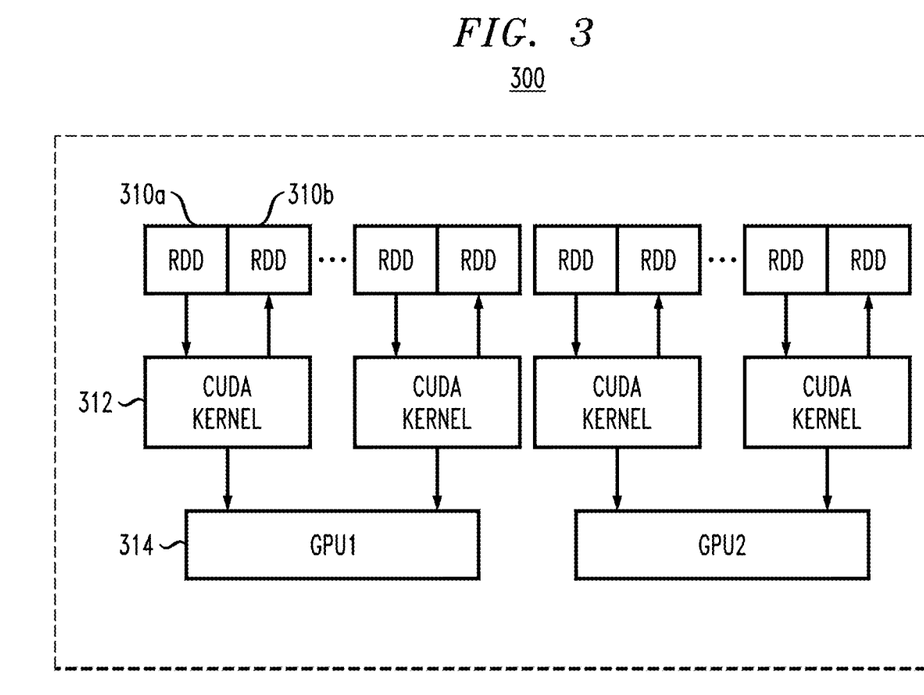
FIG. 3 illustrates data sets distributed across a plurality of cores and coupled to a plurality of GPUs for accelerating computations, in accordance with at least one embodiment.

FIG. 3 illustrates an embodiment of a machine learning system. In one embodiment, the system is configured to execute a matrix factorization algorithm for a recommender system, as one software feature in a machine learning library. For example, the matrix factorization algorithm may be an optimized CUDA®-based matrix factorization algorithm, and the machine learning library may be a scalable machine learning library as a feature of the Apache Spark software. CUDA® is a registered trademark of the NVIDIA Corporation.

In a non-limiting example, FIG. 3 illustrates node 300. Node 300 is shown having eight cores, including cores 310a and 310b, four acceleration kernels written in CUDA®, including kernel 312, and two GPUs, including GPU 314, in a cluster computing software framework. It is to be understood and appreciated that the number of cores, kernels and GPUs is not to be considered limiting.

Datasets residing on the cores are coupled to respective GPUs via respective kernels. In one embodiment, each dataset is a resilient distributed dataset (RDD). For example, datasets residing on cores 310a and 310b are coupled to the GPU 314 via kernel 312. The datasets allow for the distribution of, for example, rating data and shuffling of parameters, while the GPUs are for offloading intense computations, such as for example, linear algebra computations. Programs are able to run on multiple nodes, with multiple GPUs per node. The system of FIG. 3 leverages the scaling-out features of the cluster computing software framework, and the scaling-up features of the GPUs. Accordingly, programs may run on the CPU cores or the GPU or partitioned to be run on both.

For example, at the beginning of each iteration of the matrix factorization algorithm, rating data with learned parameters are obtained from the RDD obtained from the shuffling at the end of the last iteration. Afterward, in each node, each RDD partition makes necessary data transformation(s), sends the (transformed) data as matrices to a selected GPU, invokes the GPU kernels to perform linear algebra computation, collects result matrices from the previously selected GPU and stores the collected result matrices in RDDs. When this is done, the resulting RDDs are shuffled to be ready for the next iteration.

Advantageously, a GPU has greater computing power as compared to a CPU. For example, a GPU may have a higher floating-point operations per second (FLOP/s) rate that is at least about ten-times greater than that of a CPU, as exemplified in FIG. 1B. As such, it is advantageous to offload programs or instructions from a CPU that may require the additional computing power of a GPU.

A thread of a CPU may comprise a program instruction requiring a large amount of computation, which may benefit from being offloaded to a GPU. A first step in attempting to offload a thread is to determine whether an appropriate GPU exists and currently available to handle the thread. At least three strategies may be used with respect to offloading a thread to GPUs.

Figure 4:
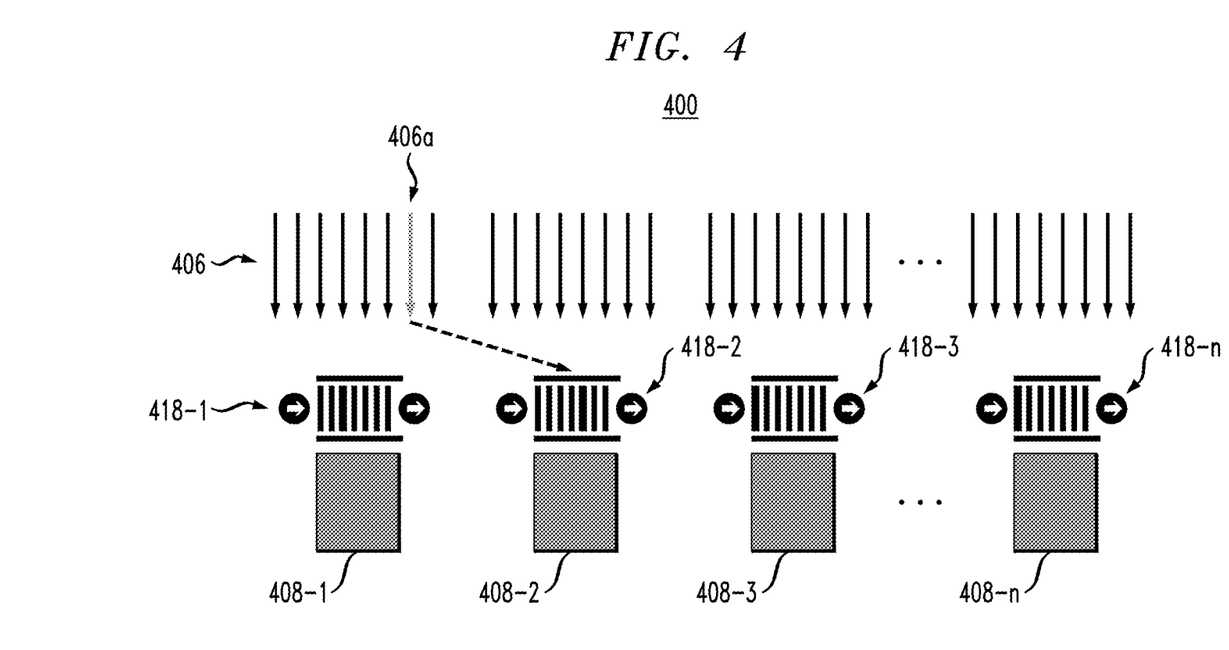
FIG. 4 illustrates a system for executing a task, in accordance with at least one embodiment.

FIG. 4 illustrates system 400 configured to execute a task or instruction, according to a first strategy. The system is shown having at least one CPU 406 having multiple threads, including thread 406a. System 400 is further shown having a plurality of GPUs 408-1 through 408-n, each having a queue 418-1 through 418-n, respectively.

A first step in executing the task of thread 406a according to the first strategy is to determine an appropriate GPU among GPU 408-1 through GPU 408-n for offloading a task workload. In one embodiment, the appropriate GPU is determined based on one or more considerations. One such consideration is queue length. For example, if CPU 406 first selects GPU 408-1 to offload thread 406a, but GPU 408-1 has a long queue 418-1, the CPU can look for a GPU with a shorter queue. Another such consideration is that the CPU may choose a GPU having the memory and compute capacity required to process the instruction of thread 406a. For example, overloading the memory and compute capacity may affect the execution time of the thread. Yet another such consideration may be socket (channel) affinity. For example, it may be advantageous to assign multiple threads to the same communication socket, as communication across GPUs would be more efficient if they are on the same socket. In general, it is advantageous to offload compute and memory intensive workloads, such as for example, iterative general matrix multiply (GEMM), according to the first offloading strategy described in FIG. 4. Accordingly, the first strategy offloads the workload from the thread to the GPU.

Figure 5:
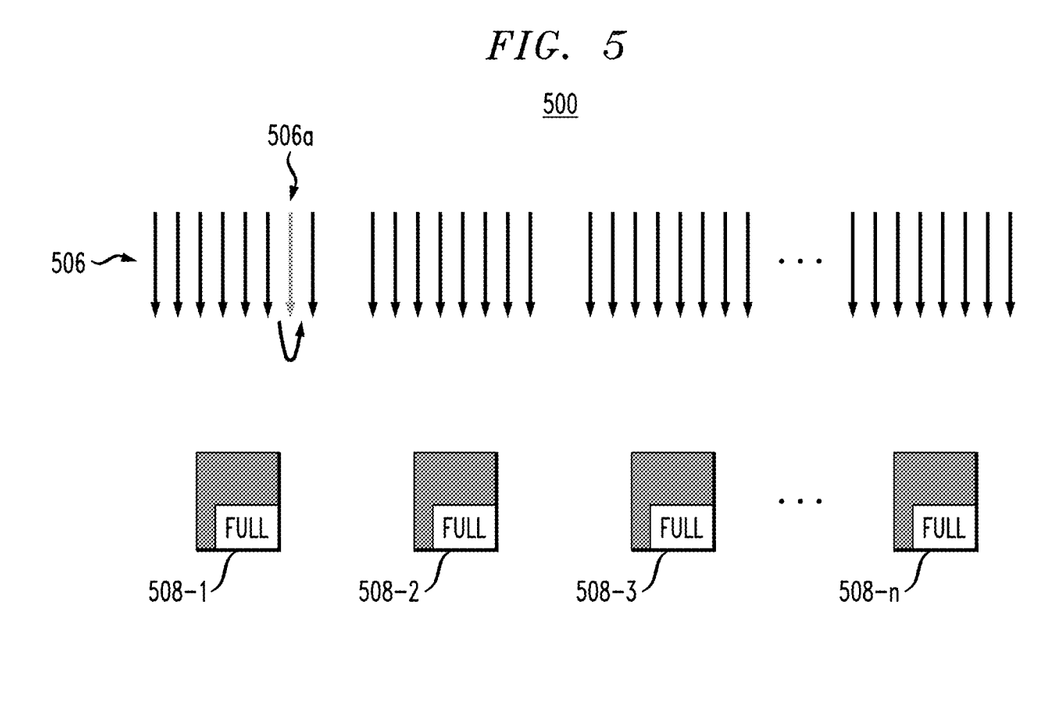
FIG. 5 further illustrates a system for executing a task, in accordance with at least one embodiment.

FIG. 5 illustrates system 500 configured to execute a task or instruction, according to a second strategy. System 500 is shown having at least one CPU 506 having multiple threads, including thread 506a. System 500 is further shown having a plurality of GPUs 508-1 through 508-n. In FIG. 5, each GPU 508-1 through GPU 508-n is full. Thus, the second offloading strategy comprises CPU 506 retaining the instruction and not offloading the instruction. In general, retaining the computation in the CPU is advantageous for workloads that would run only marginally faster on a GPU, for example a one-pass data scan. Accordingly, the second strategy uses the CPU to handle the workload if each GPU is full, thus the waiting time for GPUs would elongate the total thread execution time.

Figure 6:
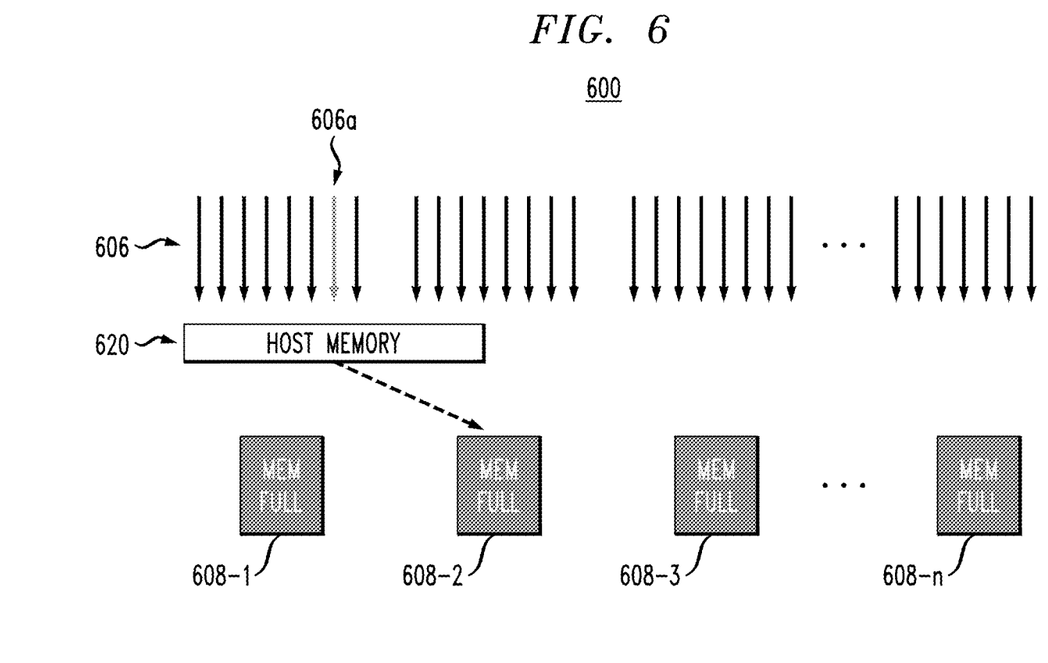
FIG. 6 still further illustrates a system for executing a task, in accordance with at least one embodiment.

FIG. 6 illustrates system 600 configured to execute a task or instruction, according to a third strategy. System 600 is shown having at least one CPU 606 having multiple threads, including thread 606a. System 600 is further shown having a plurality of GPUs 608-1 through 608-n. In FIG. 6, each GPU 608-1 through GPU 608-n has a full memory. Although the memories of GPU 608-1 through GPU 608-n are full, the GPUs are still available for computations. Thus, handling the instruction on thread 606a according to the third strategy comprises determining an appropriate GPU among GPU 608-1 through GPU 608-n, and allocating working memory on host memory 620. In general, the third strategy is advantageous for compute-intensive workloads that infrequently access external memory, such as, for example some Monte-Carlo simulations. Accordingly, the third strategy allocates needed working memory on the host and executes the workload on the GPU, even though allocation to host memory may not be as efficient as allocation to local GPU memory.

Figure 7:
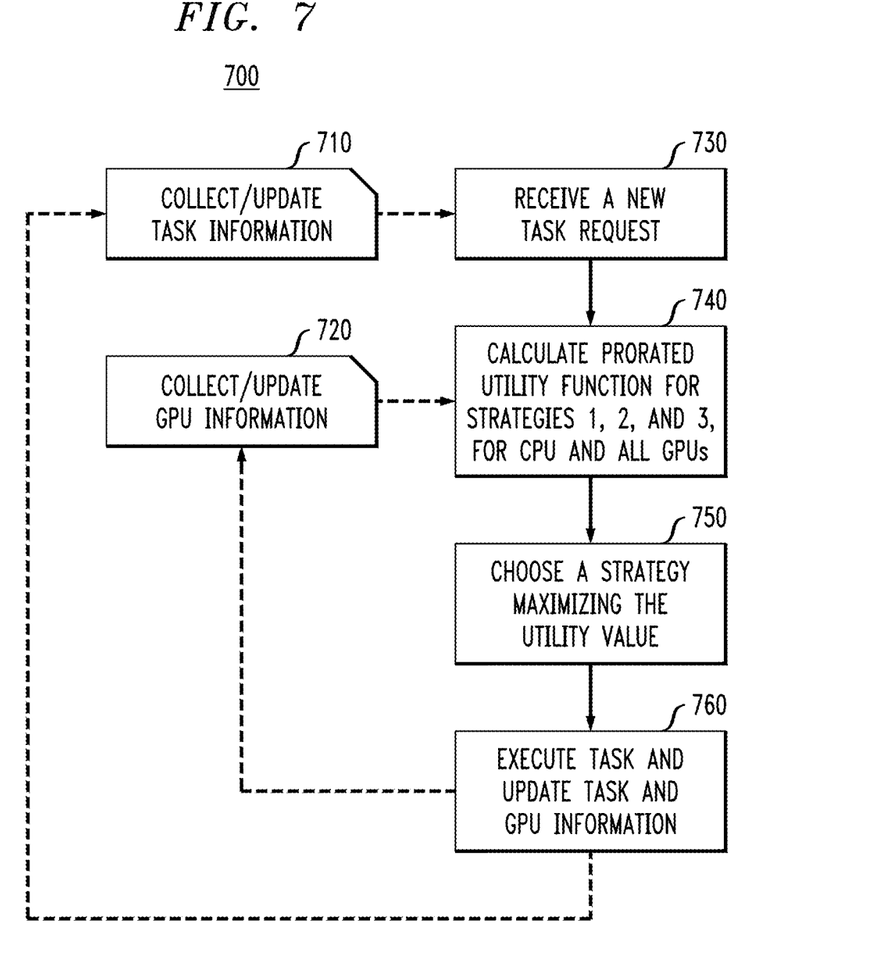
FIG. 7 illustrates a process for selecting a strategy to execute a task, in accordance with at least one embodiment.

FIGS. 4-6 described individual strategies that may be implemented to handle an instruction, or task. FIG. 7 is a flow diagram 700 illustrating the workflow used for determining the strategy to be used in handling the task assignment to CPUs or GPUs. In block 710, task information is collected. The task information may include attributes such as speedup and memory allocation requirements. In one embodiment, speedup is defined herein as performance ratio between the CPU and the GPU. For example, speedup may be derived by comparing the elapsed time of the CPU and the GPU during execution a given task. For illustrative purposes, if the elapsed time for executing a thread on a GPU is 2 seconds and the elapsed time for executing the thread on a CPU is 10 seconds, then the GPU has a speedup of 5× compared to the CPU.

In block 720, GPU information is collected. The GPU information may include the current queue length of each GPU, GPU memory utilization, GPU compute utilization, and socket affinity. In block 730, a new task request is received. In one embodiment, the new task request requires both computational time and memory allocations. In block 740, a utility value for the task is calculated for each strategy (e.g., the first, second and third strategies described herein above) based on a utility function. In one embodiment, the utility function is a prorated utility function. The utility value is calculated based on the collected task information and the collected GPU information. In one embodiment, the calculation in block 740 may also take into account the cost associated with utilizing a GPU for the computations versus not utilizing a GPU. Commonly and currently, nodes with GPUs are more expensive to rent, for example, in cloud computing environments. As such, workloads of low priority may not utilize GPUs for speed up.

The data collection/value collection may be "inline" or "offline". For example, workload speedup can use data collected inline, but may be modelled and/or calculated offline and saved in a table. In one embodiment, the queue lengths at the GPUs is dynamically observed during runtime. The affinity of sockets may be static information, but may change at reboot.

In one embodiment, the utility value is calculated by test run, workload profiling and machine learning based techniques (e.g., regression). The utility value that is calculated may then be normalized, such as to a value within the interval [0,1] (i.e., a value of 1 is the maximum utility value possible for a given strategy, and a value of 0 is the lowest utility value possible for a given strategy). Depending on the optimization target, the utility value may represent factors, which may include execution time, cost, etc. Specific factors include, but are not limited to, infrastructure expense (e.g., GPU cycle being more expensive than a CPU cycle) and job completion time delay.

In block 750, a strategy is chosen that maximizes the utility value. For example, if the utility values are normalized, then the strategy is chosen corresponding to a value closest to 1. In block 760, the task is executed in accordance with the chosen strategy, and the GPU and the task information is updated.

The embodiments described herein implement a process for dynamically balancing usage of CPUs and accelerators. In one embodiment, a logic component on the CPU is configured to perform one or more steps of the process. This process leverages all CPU cores and GPUs by selecting a utility-maximizing strategy for handling a work. Accordingly, the embodiments described herein efficiently schedule workloads in a hybrid computing system.

Such hybrid CPU and GPU architecture can be provisioned as a cloud service to end users who do not own the hardware. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
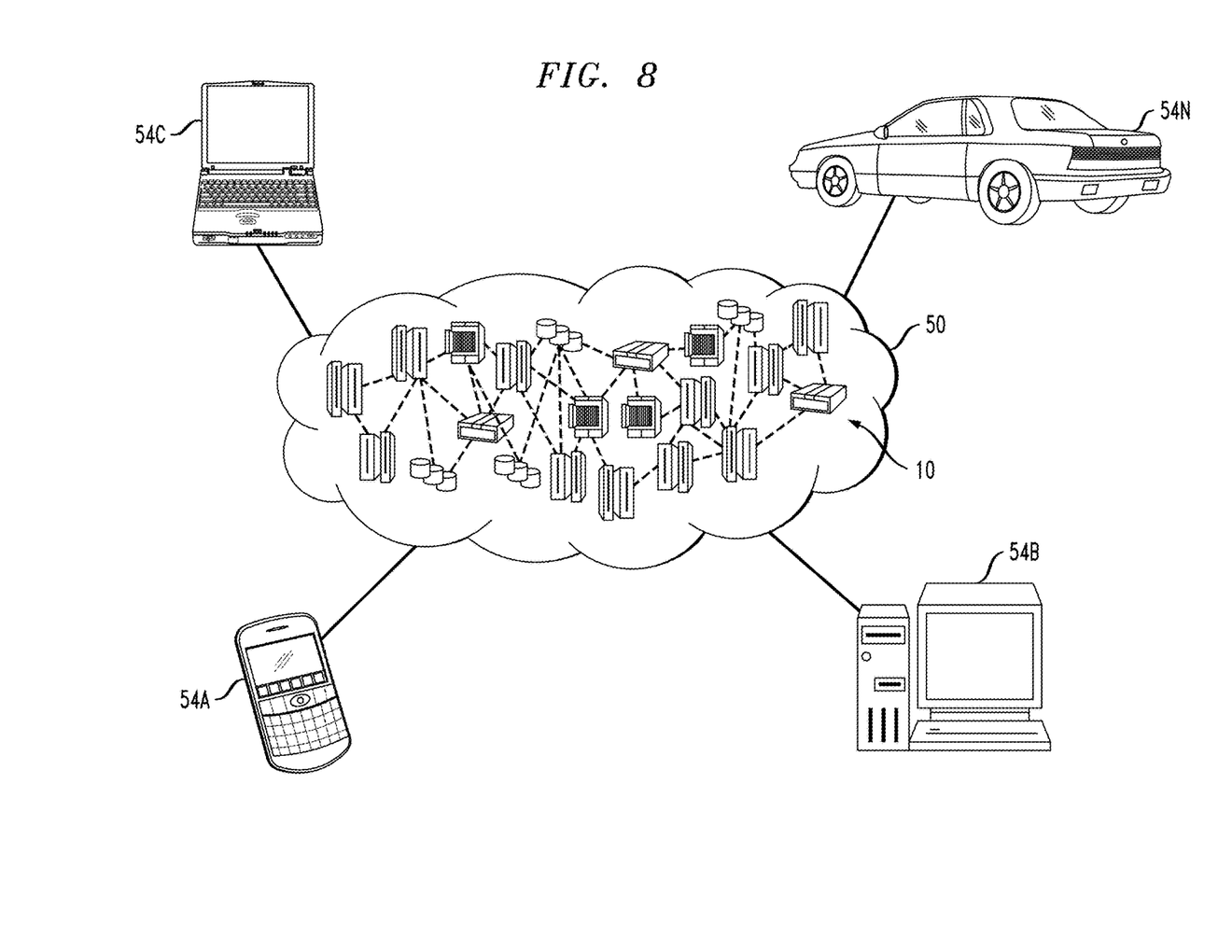
FIG. 8 illustrates a cloud computing environment, in accordance with at least one embodiment.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 9:
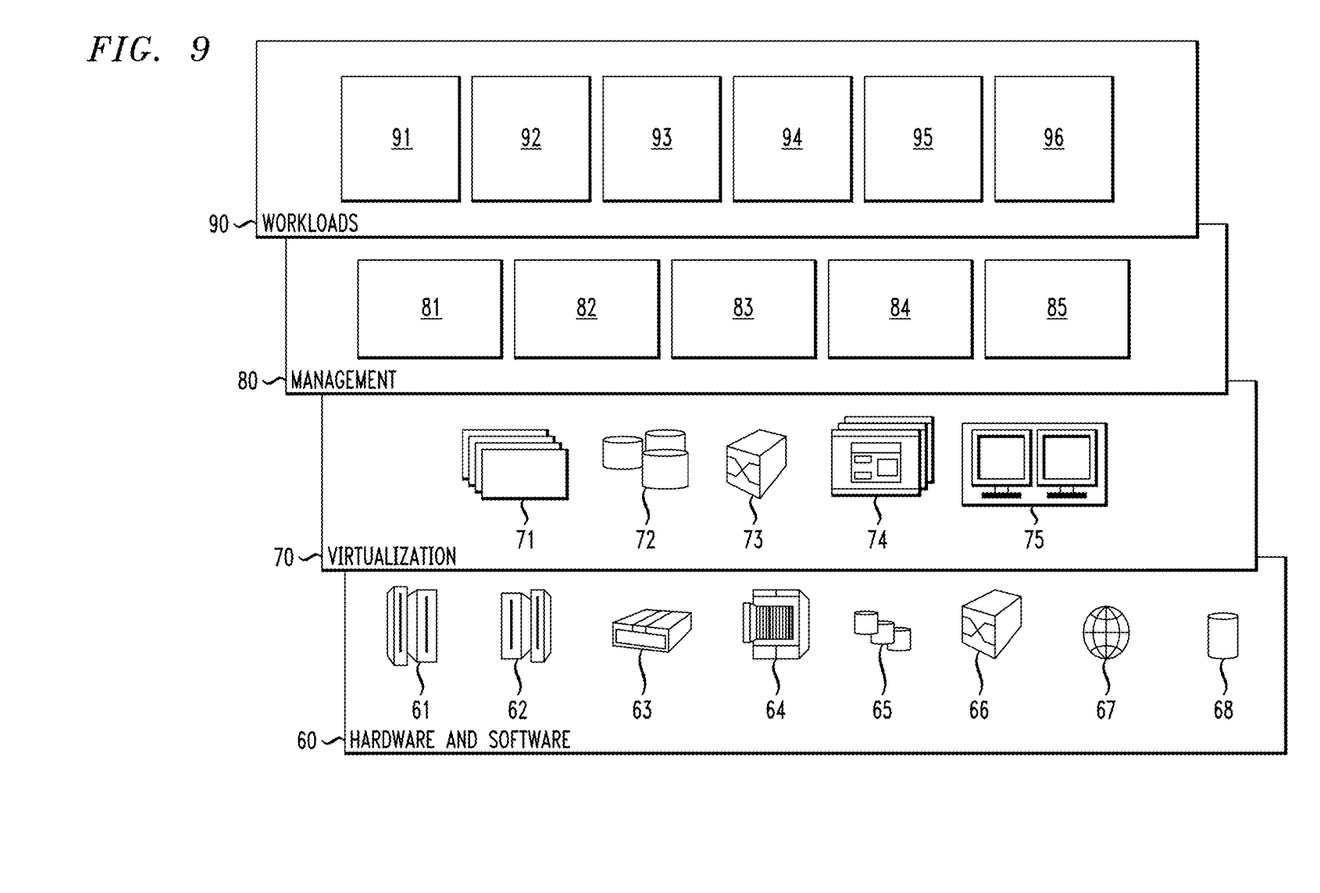
FIG. 9 illustrates abstraction model layers, in accordance with at least one embodiment.

Referring now to FIG. 9, a set of functional abstraction layers provided by cloud computing environment 50 (FIG. 1) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and hybrid computing infrastructure 96 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A computer-implemented method comprising:
collecting task information and accelerator information, wherein the accelerator information is associated with one or more accelerators;
receiving a task request associated with a workload;
calculating a utility value based on the collected task information and the collected accelerator information for a plurality of strategies for executing the workload, wherein at least two of the plurality of strategies are associated with a distribution of the workload between a central processing unit (CPU) and the one or more accelerators;
selecting a strategy from the plurality of strategies having a maximum utility value;
executing the task request according to the selected strategy; and
updating the task information and the accelerator information,
wherein the task information comprises information selected from the group consisting of: speedup and memory allocation requirements, and wherein the accelerator information comprises information selected from the group consisting of: queue length, computational utilization, memory utilization, and socket affinity; and
wherein said executing the task request according to the selected strategy comprises performing offloading the workload from the thread to an accelerator selected based on one or more considerations.

2. The method of claim 1, wherein the CPU is associated with a resilient distributed dataset (RDD), and wherein the RDD is a read-only multiset of data items distributed over a cluster of machines.

3. The method of claim 1, wherein the workload is associated with a thread of the CPU.

4. The method of claim 3, wherein said executing the task request according to the selected strategy further comprises performing at least one action selected from the group consisting of: retaining the workload on the thread in response to determining that each accelerator is unable to accommodate the workload, and allocating working memory to host memory prior to offloading the workload from the thread to an accelerator in response to determining that memory with the at least one accelerator is full.

5. The method of claim 4, wherein said offloading the workload from the thread to the accelerator comprises using a compute unified device architecture (CUDA) kernel.

6. The method of claim 4, wherein the one or more considerations are selected from the group consisting of: queue length, memory capacity, compute capacity, and socket affinity.

7. The method of claim 1, wherein at least one accelerator is a graphics processing unit (GPU).

8. The method of claim 1, wherein the task request comprises a request selected from the group consisting of: workload acceleration and memory allocation acceleration.

9. The method of claim 1, wherein the method is implemented within a cloud computing environment.

10. An article of manufacture comprising a computer-readable storage medium for storing computer readable program code which, when executed, causes a computer to:
collect task information and accelerator information, wherein the accelerator information is associated with one or more accelerators;
in response to receipt of a task request based on the collected task information and the collected accelerator information for a plurality of strategies for executing the workload, wherein at least two of the plurality of strategies are associated with a distribution of the workload between a central processing unit (CPU) and the one or more accelerators;
select a strategy from the plurality of strategies having a maximum utility value;
execute the task request according to the selected strategy; and
update the task information and the accelerator information,
wherein the task information comprises information selected from the group consisting of: speedup and memory allocation requirements, and wherein the accelerator information comprises information selected from the group consisting of: queue length, computational utilization, memory utilization, and socket affinity; and
wherein said executing the task request according to the selected strategy comprises performing offloading the workload from the thread to an accelerator selected based on one or more considerations.

11. The article of claim 10, wherein the workload is associated with a thread of the CPU.

12. The article of claim 11, wherein said execution of the task request according to the selected strategy further comprises program code to perform at least one action selected from the group consisting of: retain the workload on the thread in response to determining that each accelerator is unable to accommodate the work, and allocate working memory to host memory prior to offloading the workload from the thread to an accelerator in response to determining that memory within the at least one accelerator is full.

13. The article of claim 12, wherein said offloading the workload from the thread to the accelerator comprises using a compute unified device architecture (CUDA) kernel.

14. The article of claim 12, wherein the one or more considerations are selected from the group consisting of: queue length, memory capacity, compute capacity, socket affinity, and combinations thereof.

15. The article of claim 10, wherein at least one accelerator is a graphics processing unit (GPU).

16. A system comprising:
one or more accelerators operatively coupled to a central processing unit (CPU), wherein the CPU is configured to:
collect task information and accelerator information, wherein the accelerator information is associated with the one or more accelerators;
receive a task request associated with a workload;
calculate a utility value based on the collected task information and the collected accelerator information for a plurality of strategies for executing the workload, wherein at least two of the plurality of strategies are associated with a distribution of the workload between a central processing unit (CPU) and the one or more accelerators; select a strategy from the plurality of strategies having a maximum utility value;
execute the task is executed according to the selected strategy; and
update the task information and the accelerator information,
wherein the task information comprises information selected from the group consisting of: speedup and memory allocation requirements, and wherein the accelerator information comprises information selected from the group consisting of: queue length, computational utilization, memory utilization, and socket affinity; and
wherein said executing the task request according to the selected strategy comprises performing offloading the workload from the thread to an accelerator selected based on one or more considerations.

* * * * *